(12) United States Patent
Losev et al.

(10) Patent No.: US 9,015,470 B2
(45) Date of Patent: Apr. 21, 2015

(54) ADAPTIVE VIDEO SERVER WITH FAST INITIALIZATION AND METHODS FOR USE THEREWITH

(71) Applicant: Morega Systems Inc., Toronto (CA)

(72) Inventors: Eugene Losev, Brampton (CA); Thomas Walter Maxwell, Brampton (CA); Michael Podolsky, Thornhill (CA); Ashraf Tahir, Oakville (CA); King Chiu Tam, Vaughan (CA)

(73) Assignee: Morega Systems, Inc, Mississauga (CA)

( * ) Notice: Subject to any disclaimer, the term of this patent is extended or adjusted under 35 U.S.C. 154(b) by 179 days.

(21) Appl. No.: 13/732,479

(22) Filed: Jan. 2, 2013

(65) Prior Publication Data

US 2014/0129825 A1 May 8, 2014

Related U.S. Application Data

(60) Provisional application No. 61/724,110, filed on Nov. 8, 2012.

(51) Int. Cl.
| | |
|---|---|
| *H04L 29/06* | (2006.01) |
| *H04N 21/27* | (2011.01) |
| *H04N 21/2347* | (2011.01) |
| *H04N 21/24* | (2011.01) |
| *H04N 21/647* | (2011.01) |
| *H04N 21/845* | (2011.01) |

(52) U.S. Cl.
CPC .............. *H04L 65/607* (2013.01); *H04N 21/27* (2013.01); *H04L 65/605* (2013.01); *H04L 65/4084* (2013.01); *H04N 21/2347* (2013.01); *H04N 21/2402* (2013.01); *H04N 21/64769* (2013.01); *H04N 21/8456* (2013.01)

(58) Field of Classification Search
CPC .................. H04N 21/23473; H04N 21/23476; H04N 21/8456; H04N 21/63345
USPC .......................................................... 713/153
See application file for complete search history.

(56) References Cited

U.S. PATENT DOCUMENTS

| | | | | |
|---|---|---|---|---|
| 7,640,274 | B2 * | 12/2009 | Tinker et al. ........................... 1/1 |
| 8,179,440 | B2 * | 5/2012 | Ran et al. ....................... 348/159 |
| 2009/0254657 | A1 * | 10/2009 | Melnyk et al. ................. 709/224 |
| 2009/0320077 | A1 * | 12/2009 | Gazdzinski ...................... 725/62 |
| 2010/0034256 | A1 * | 2/2010 | Bennett ..................... 375/240.01 |
| 2010/0135637 | A1 * | 6/2010 | McDermott et al. ............. 386/75 |
| 2010/0142915 | A1 * | 6/2010 | McDermott et al. ............ 386/68 |
| 2010/0333149 | A1 * | 12/2010 | Sharma et al. .................. 725/91 |

(Continued)

*Primary Examiner* — Hadi Armouche
*Assistant Examiner* — Hee Song
(74) *Attorney, Agent, or Firm* — Garlick & Markison; Bruce E. Stuckman

(57) ABSTRACT

A streaming video server includes a virtual file system that stores playlist data corresponding to a plurality of video programs available from at least one video source and that stores at least one initial video program segment for each of the plurality of video segments. The streaming video server receives a request for a selected one of the plurality of video programs from a client device. The selected one of the plurality of video programs is retrieved from the at least one video source in response to the request. A plurality of encoded segments are generated from the selected one of the plurality of video programs, based on rate data. A multiplexer generates a plurality of output segments from the at least one initial video program segment corresponding to the selected one of the plurality of video programs and the plurality of encoded video program segments.

11 Claims, 10 Drawing Sheets

(56) References Cited

U.S. PATENT DOCUMENTS

| | | | |
|---|---|---|---|
| 2011/0216785 A1* | 9/2011 | Begen et al. | 370/477 |
| 2011/0246616 A1* | 10/2011 | Ronca et al. | 709/219 |
| 2012/0278833 A1* | 11/2012 | Tam | 725/31 |
| 2012/0324123 A1* | 12/2012 | Fox et al. | 709/231 |
| 2013/0061040 A1* | 3/2013 | Kiefer et al. | 713/155 |
| 2013/0064306 A1* | 3/2013 | Mamidwar et al. | 375/240.26 |
| 2013/0179590 A1* | 7/2013 | McCarthy et al. | 709/231 |
| 2013/0188928 A1* | 7/2013 | Ogawa et al. | 386/248 |
| 2013/0324123 A1* | 12/2013 | Ianev et al. | 455/435.1 |

* cited by examiner

Variant playlist data 114

| Title | Bit Rate | Segment Playlist Address |
|---|---|---|
| Moon Wars | 256 kbps | www.Morega.com/256btw00000000 |

FIG. 4

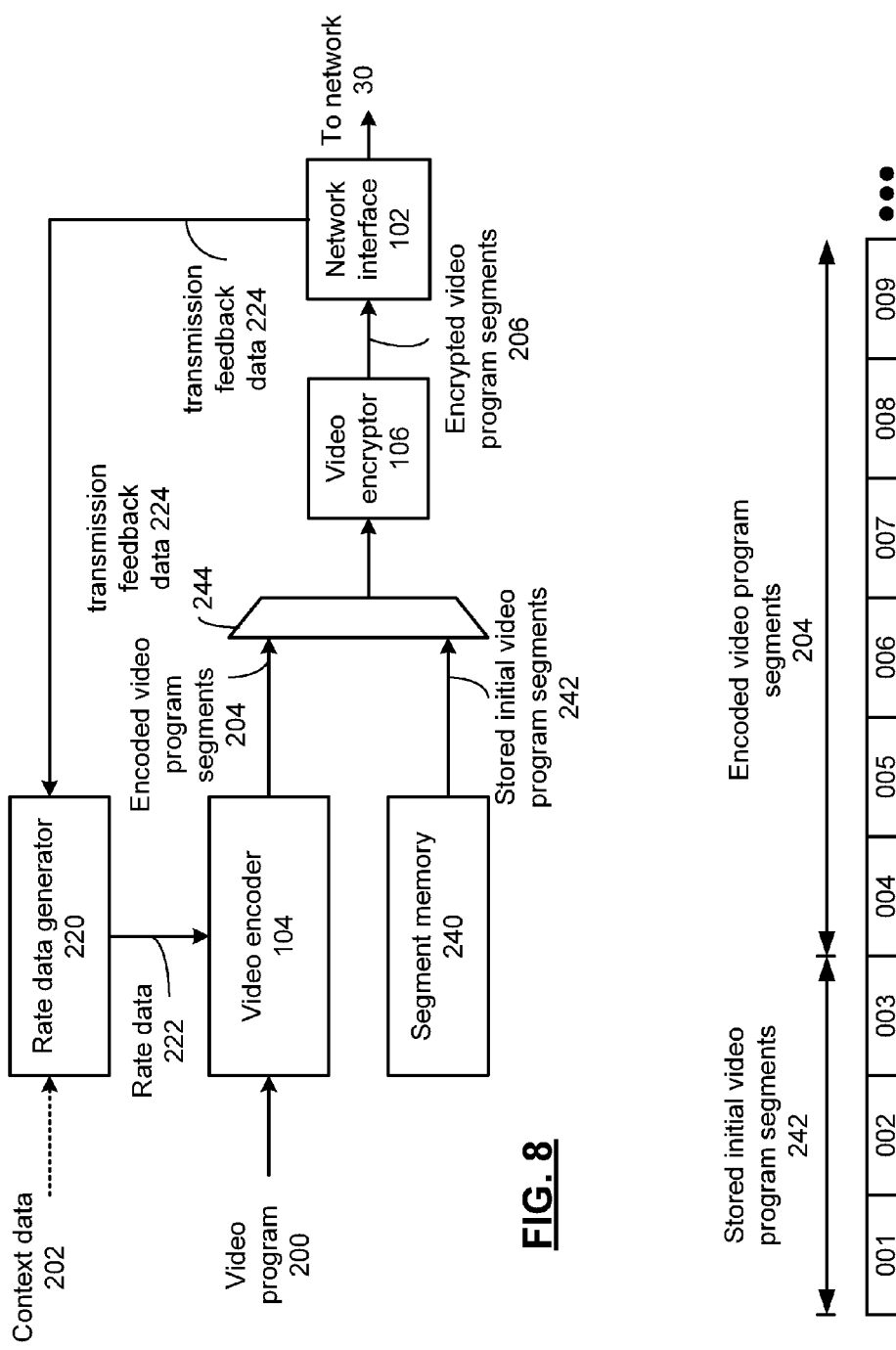

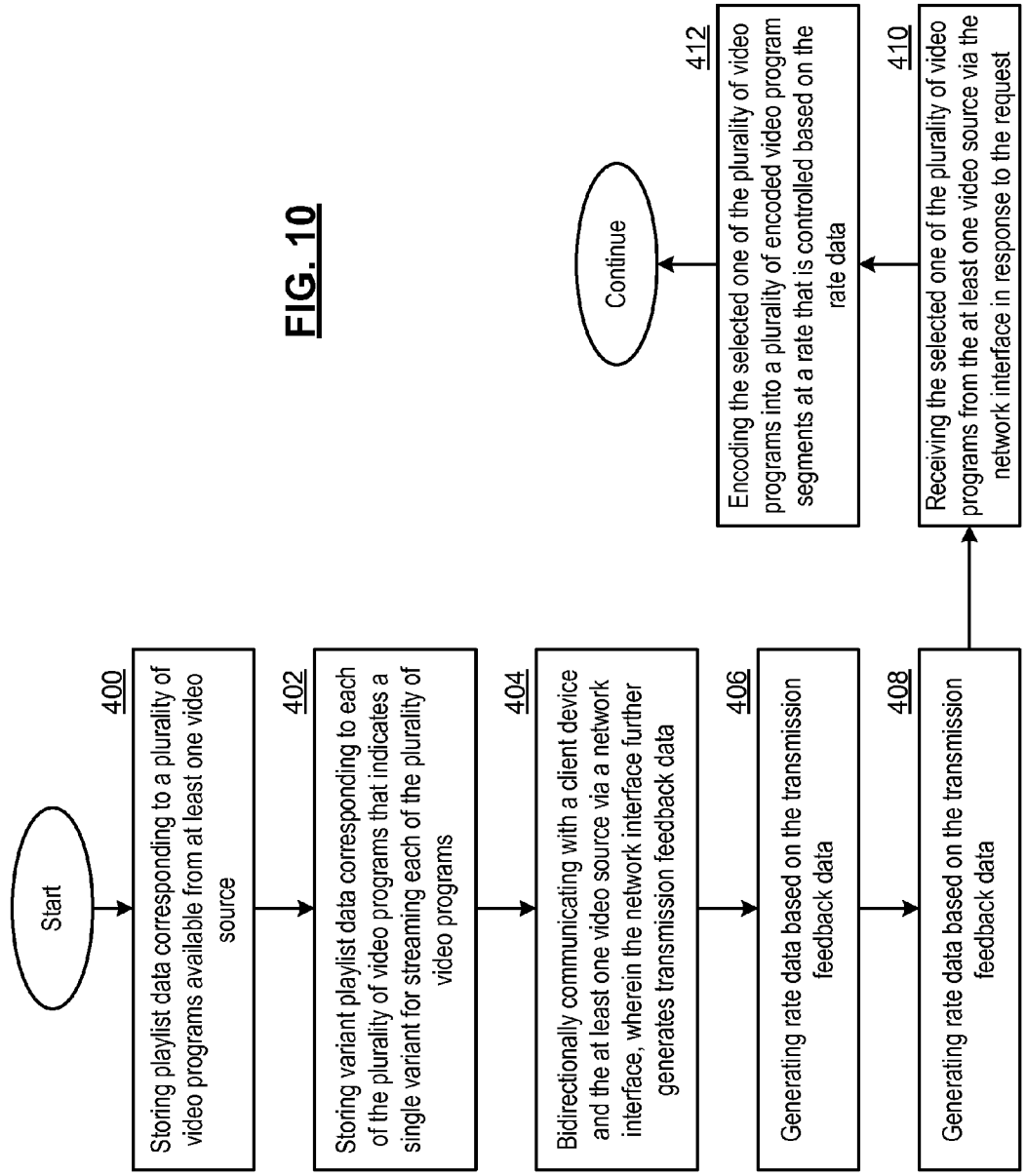

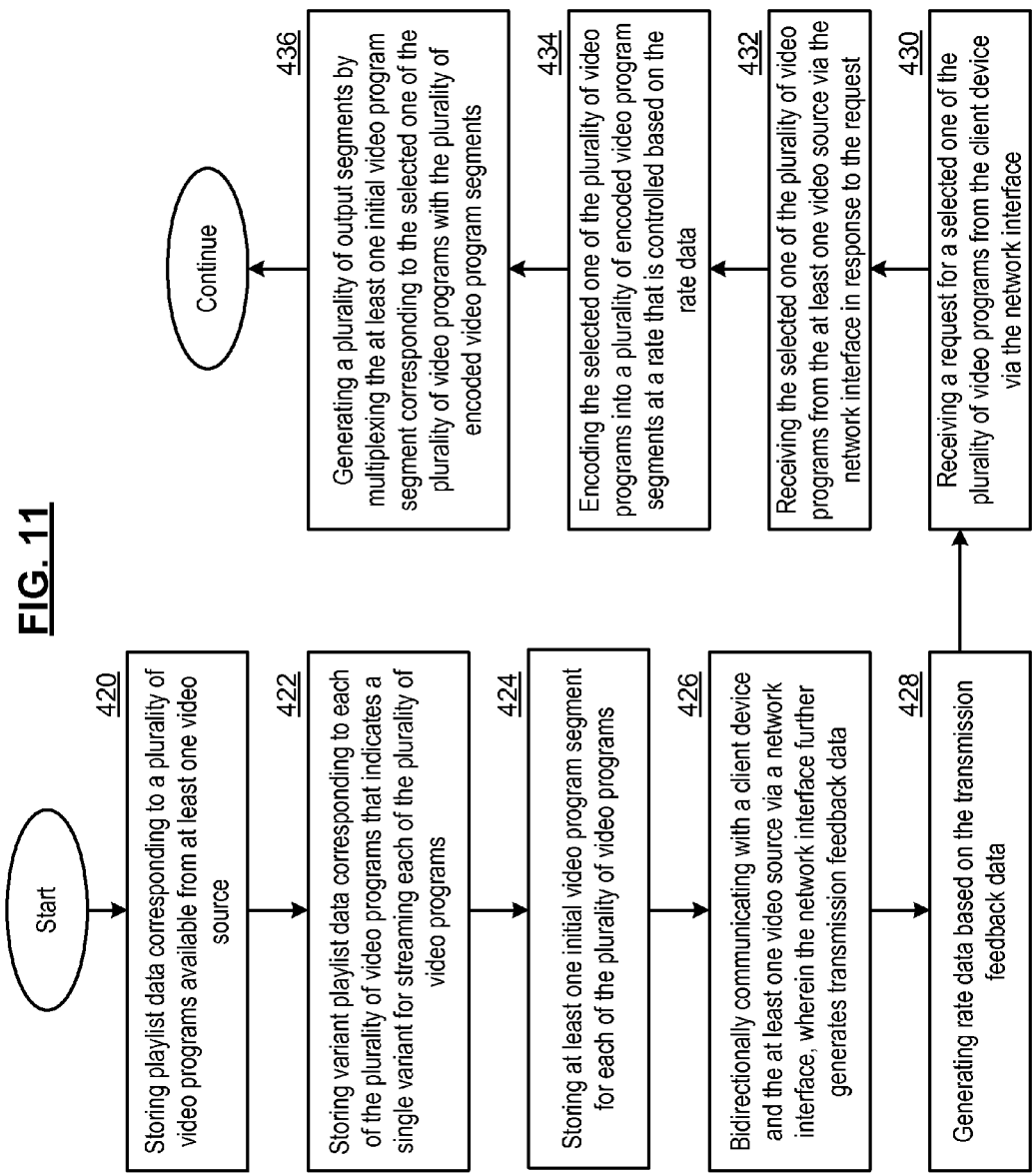

ADAPTIVE VIDEO SERVER WITH FAST INITIALIZATION AND METHODS FOR USE THEREWITH

CROSS REFERENCES TO RELATED APPLICATIONS

The present application claims priority under 35 U.S.C. 119 to the provisionally filed application entitled, ADAPTIVE VIDEO SERVER WITH DATA RATE CONTROL AND METHODS FOR USE THEREWITH, having application Ser. No. 61/724,110, filed on Nov. 8, 2012; the contents of which are incorporated herein by reference thereto.

TECHNICAL FIELD OF THE INVENTION

The present invention relates to servers used for streaming media applications including video on demand.

DESCRIPTION OF RELATED ART

The number of households having multiple television sets is increasing, and many users want the latest and greatest video viewing services. As such, many households have satellite receivers, cable set-top boxes, and televisions, et cetera, that provide access to broadcast video services. For in-home Internet access, each computer or Internet device can have its own Internet connection. As such, each computer or Internet device includes a modem. As an alternative, an in-home wireless local area network may be used to provide Internet access and to communicate multimedia information to multiple devices within the home. In such an in-home local area network, each computer or Internet device includes a network card to access an IP gateway. The gateway provides the coupling to the Internet. As an alternative to broadcast video, the Internet provides access to streaming video services. Instead of broadcasting all programming to every customer, each customer receives only those programs that they want, when they want them.

One of the most common ways of streaming continuous video over the Internet today is through the use of the "HTTP Live Streaming" (HLS) protocol. It is developed by Apple Corporation and supported in most of Apple's devices. The HLS protocol operates on a streaming server that uses a standard HTTP (Hypertext Transfer Protocol) web server component. A video encoder takes a source video and encodes it at different bitrates intended for use in different network conditions (high or low capacity) and with different playback devices. The stream is a Motion Picture Expert Group (MPEG2) transport stream divided into multiple segments. Each segment is a compressed piece of the original video of several seconds length. If a segment length is 10 seconds, a one hour movie could be streamed in 360 segments. The segments, put together, form the stream and include the bits from the binary compressed version of the content. Each segment is downloadable over HTTP and accessible via URL. In operation, a client device that wishes to play a streaming video requests and downloads each segment of the stream via separate URL. The segments are decoded by the client device in sequence to play the stream.

A text file with the list of the segment's URLs is called a playlist. A simple playlist can appear as follows:
   http://myserver.com?segid=100
   http://myserver.com?segid=101
   http://myserver.com?segid=102
   http://myserver.com?segid=103
   http://myserver.com?segid=104
   #EXT-X-ENDLIST
where each line is a segment's URL and #EXT-X-ENDLIST is an indication of the end of the stream. There are different types of playlists. An Already Recorded Show Playlist is created, when the server has the entire show from the beginning to the end. This type of playlist contains list of URLs for all segments and terminated with #EXT-X-ENDLIST tag, indicating that there will be no segments after that point for this stream. The client assumes that all segments are accessible at all times, and could be requested in any order at any moment. This type of play list allows the client to start playback at any random position at the stream, and jump back or forward.

Another form of playlist is a Sliding Window Playlist. This type of playlist is used for live translation/encoding. The playlist contains only a limited number of segments without the termination tag. The client is only able to request segments from this list, without seeing the entire stream. Upon receiving the last segment from the last playlist the client sends request for another playlist expecting to get list of segments beyond the last one it just played back. At the end of the content the server publishes a playlist with an #EXT-X-ENDLIST tag present, informing the client that the current playlist is the last playlist. Because the client has limited visibility to the stream, this type of playlist doesn't allow the client to perform any trick operation on the stream. Moreover, the client is not even informed about the total length of the stream. An example of a Sliding Window Playlist is presented below:
   Playlist #1
   http://myserver.com?segid=100
   http://myserver.com?segid=102
   http://myserver.com?segid=103
   Playlist #2
   http://myserver.com?segid=104
   http://myserver.com?segid=105
   http://myserver.com?segid=106
   Playlist #3
   http://myserver.com?segid=107
   http://myserver.com?segid=108
   http://myserver.com?segid=109
   #EXT-X-ENDLIST In this example, the client requests Playlist #1, after playing back segment 103 it sends request for another playlist, receiving Playlist #2. After playing back segment 106 it sends request for another playlist, receiving Playlist #3. The playback is done when the client plays last segment from the Playlist #3 and encounters the termination tag.

A further type of playlist is an Event Playlist that is designed for broadcast live events. It has only one playlist, which contains list of the segments from the beginning of the content to the current moment. Whenever a new segment is available it is added to the bottom of the list. The end of list termination tag added as the last line when the event is over. In operation, every time the client reaches the end of current playlist and doesn't encounter a termination tag it requests a new playlist from the server. The event playlist enables the client to perform trick play on the already encoded portion of the content, though, the total length of the program is not available. As the playlist keeps growing over time the amount of traffic and load on the server is getting bigger. By the end of the program the client receives the entire playlist—1200 lines long for a one hour movie with 3 second segments.

One feature of the HLS standard is support for streaming of content with adaptive bitrate. Bitrate is a property of the video stream measured in bits per second. It represents the number of bits in one second of the media file. Higher bitrate streams are bigger, but have better quality. Lower bitrate streams are smaller, and although they have poor quality, because of the small size they could be transferred to the client much faster. The bitrate is chosen by the client depending on the quality of the network connection. At any time during streaming, the client, depending on the network bandwidth at the moment, may switch to a different bitrate. The new bitrate could be either higher or lower than the current one.

HLS implements adaptive bitrate support by introducing a variant playlist. It is a master playlist with a list of URLs pointing to regular playlists files, described above. Each URL is a reference to a playlist of a particular bitrate. Below is an example of a variant playlist:

EXTM3U
EXT-X-STREAM-INF:PROGRAM-ID=1, BANDWIDTH=620000
http://myserver.com/hls/movie/620 kb/prog_index.m3u8
EXT-X-STREAM-INF:PROGRAM-ID=1, BANDWIDTH=320000
http://myserver.com/hls/movie/320 kb/prog_index.m3u8

This variant playlist refers to two regular playlists; the first is for 620 kb/sec content and the second is for 320 kb/sec. At the beginning of a program, the client downloads and parses the variant playlist. The client assumes that segments of all bitrates listed in the variant playlist are accessible at any time. If, for example, the client is experiencing a good network connection, the client may decide to start playback with the highest available bitrate, which is 620 kb/sec in the case above. The client gets the playlist for this bitrate using the URL listed in variant playlist:

http://myserver.com/hls/movie/620 kb/prog_index.m3u8

The client parses the playlist and starts downloading of the segments one by one. If, during downloading of a segment with id=103, the network signal got weaker, the client may not be able to fetch the segment fast enough. In this case the client may fall back to a lower bitrate 320 kb/sec. The client discards the partially downloaded segment with id=103, and starts downloading segments from the lower bitrate playlist starting from the segment with id=103.

An advantage of HLS streaming is that the server is a standard web server. Beyond the application-specific tools needed for segmentation and playlist generation, the software and infrastructure comprises of standard and freely available components that are often already in place. The limitations and disadvantages of HLS and other conventional and traditional approaches will become apparent to one of ordinary skill in the art through comparison of such systems with the present invention.

BRIEF DESCRIPTION OF THE SEVERAL VIEWS OF THE DRAWINGS

FIG. 4 presents a block diagram representation of variant playlist data 114 in accordance with an embodiment of the present invention.

FIG. 8 presents a block diagram representation of an encoder 104 in accordance with an embodiment of the present invention.

FIG. 9 presents a temporal diagram representation of program segments in accordance with an embodiment of the present invention.

FIG. 10 presents a flowchart representation of a method in accordance with an embodiment of the present invention.

FIG. 11 presents a flowchart representation of a method in accordance with an embodiment of the present invention.

DETAILED DESCRIPTION OF THE INVENTION INCLUDING THE PRESENTLY PREFERRED EMBODIMENTS

Figure 1:
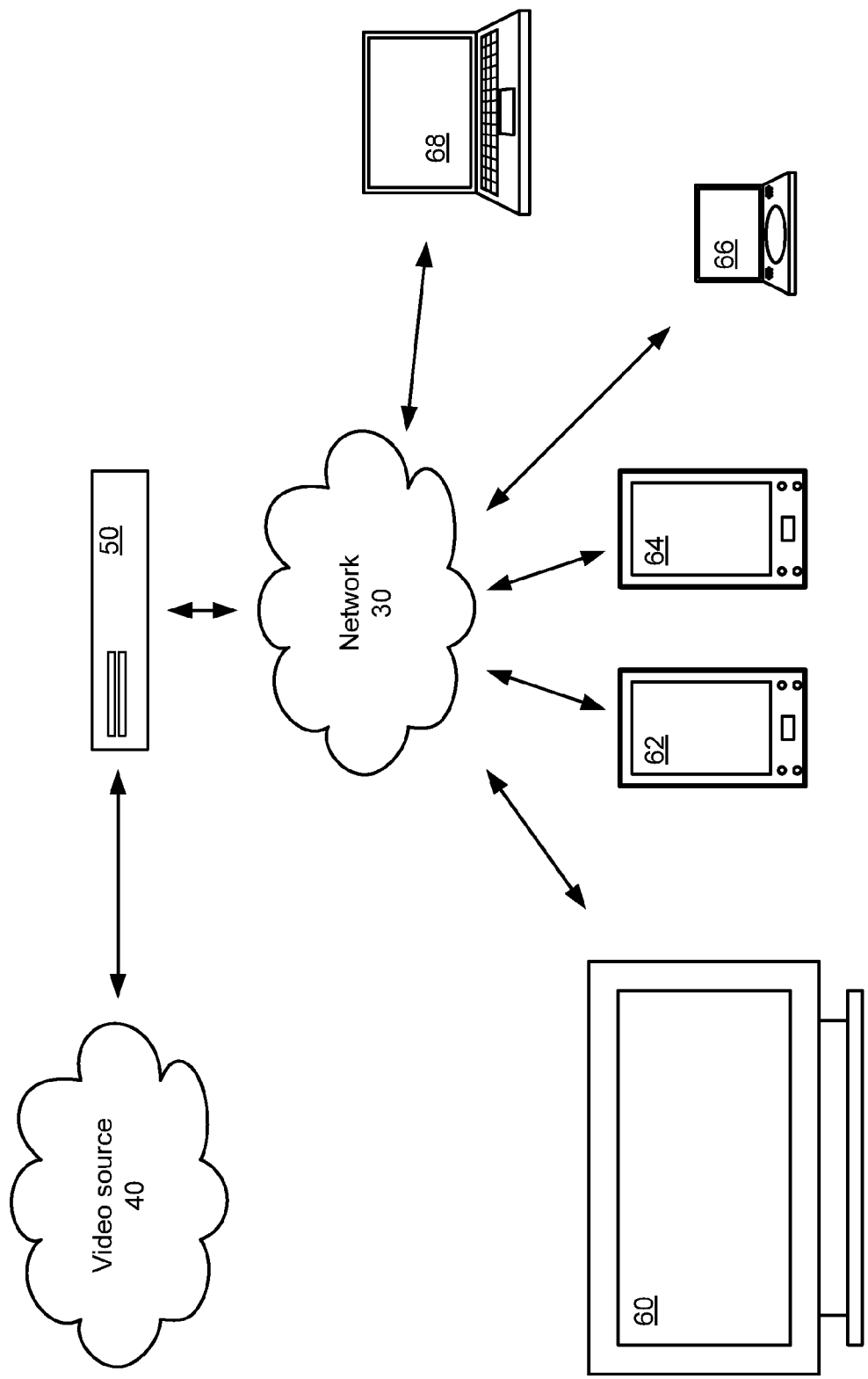
FIG. 1 presents a pictorial representation of a content distribution system that in accordance with an embodiment of the present invention.

FIG. 1 presents a pictorial representation of a content distribution system in accordance with an embodiment of the present invention. In particular, a streaming video server 50 is capable of accessing and distributing content from one or more video sources 40 to a plurality of client devices such as a television 60, smart phone, internet tablet or other personal media players 62 and 64, handheld video player 66, and personal computer 68. While specific client devices are shown, video server 50 is capable of accessing and distributing content from one or more video sources 40 to other client devices that can receive and reproduce media content.

The streaming video server 50 uses an on-demand encoding process and a virtual file system. In an embodiment of the present invention, the streaming video server 50 allows adaptable bitrates to be supported with reduced requirements for persistent storage. The streaming video server 50 accesses a virtual file system containing the files needed for streaming: variant playlist files, playlist files, content encryption keys, and video segment files. Most of the video data in the file system is not stored in a real non-volatile storage device; instead the data may be generated only when necessary due to a read operation in request for particular video content from a client device.

In the example shown, the video source or sources 40 are external to the system and coupled to the streaming video server 50 to provide coded audio-video streams via a secure channel, such as a secure socket layer (SSL) connection, a private network, a virtual private network or other secure connection. The video source or sources 40 can have two types of content: live and pre-recorded. The video source 40 can be a live video source such as a broadcast cable network, a broadcast satellite network, a broadcast television network, an IP television distribution system, a broadcast mobile network, a video conferencing service or other source of live video. Example of video sources 40 of prerecorded content include a video on demand source such as a YouTube, Hulu, Netflix, or other streaming video source, a cable or IP television video on demand network, a digital video recorder, UPnP media server, camcorder, personal computer or other source of stored video. The two types of content can be handled differently when limited network bandwidth causes the rate of data transfer to the client to be lower than the encoding rate. For live content, the streaming system discards portions of the audio-video stream that could not be transferred within some time limit. This ensures that the delay between transmission at the source, and decoding and playback at the client is bounded. For a video conference, this means that conversations will not be hampered by excessive delays, but there may be discontinuities in the conversation when the network slows suddenly. Pre-recorded content can be streamed in a continuous manner. If the network slows suddenly and the client runs out of data to decode, it handles this in the short term by waiting for more data, and in the longer term by selecting a variant playlist with a lower bitrate.

In operation, the streaming video server 50 transcodes or decodes and re-encodes the content from a video source 40 to the bitrates corresponding to the playlists. In this fashion, encoding of a video program is performed only when it is needed in response to a client's request for that particular program. Therefore, videos that are made available by the streaming video server 50, but never requested by the client, do not incur the overhead of encoding.

When streaming is initiated, a video encoder of streaming video server 50 is allocated for the session. The encoder outputs a continuous audio-video bitstream and then a post-processing step breaks the streaming into the required segments. In addition, the encryption key generation process can be performed on-demand. This allows the keys to not be saved to a storage device, protecting the security of the key from being read without authorization. For increased content security, the keys can be generated randomly and are never used for more than one streaming session. The encryption process can also be performed on-demand.

In operation, the streaming video server 50 produces segments in-order, i.e. 100, 101, 102 and so on. This works well if the requests from the client come in order. However, every request out of order requires repositioning in the input stream and therefore restarts the transcoder from this new position. This action takes can lead to a delay of 10-20 seconds. If HLS bitrate control were implemented as per specification, each change of bitrate by the client would result in a request of an out of order segment, leading to a delay. Further, each delay could make the client to think that there is not enough network bandwidth, and the client could respond by lowering the bitrate even more. Ultimately, this could result where the client continues to switch the bitrate until the lowest possible bitrate is reached.

To address this issue, the streaming video server 50 presents a variant playlist that indicates only a single bitrate, i.e. a single variant (a single entry on the list—as opposed to multiple bit rate choices). This eliminates attempts at rate control from the client side. Instead, the streaming video server 50 measures the network bandwidth on the server side, and adjusts the bitrate of the generated video stream according to the current network conditions. As the client doesn't perform any bitrate control, it never sends an out-of-order request, and the transcoder is never restarted during bitrate adjustment.

Streaming video server 50 can further include one or more features of the present invention described further in conjunction with FIGS. 2-12 that follow.

Figure 2:
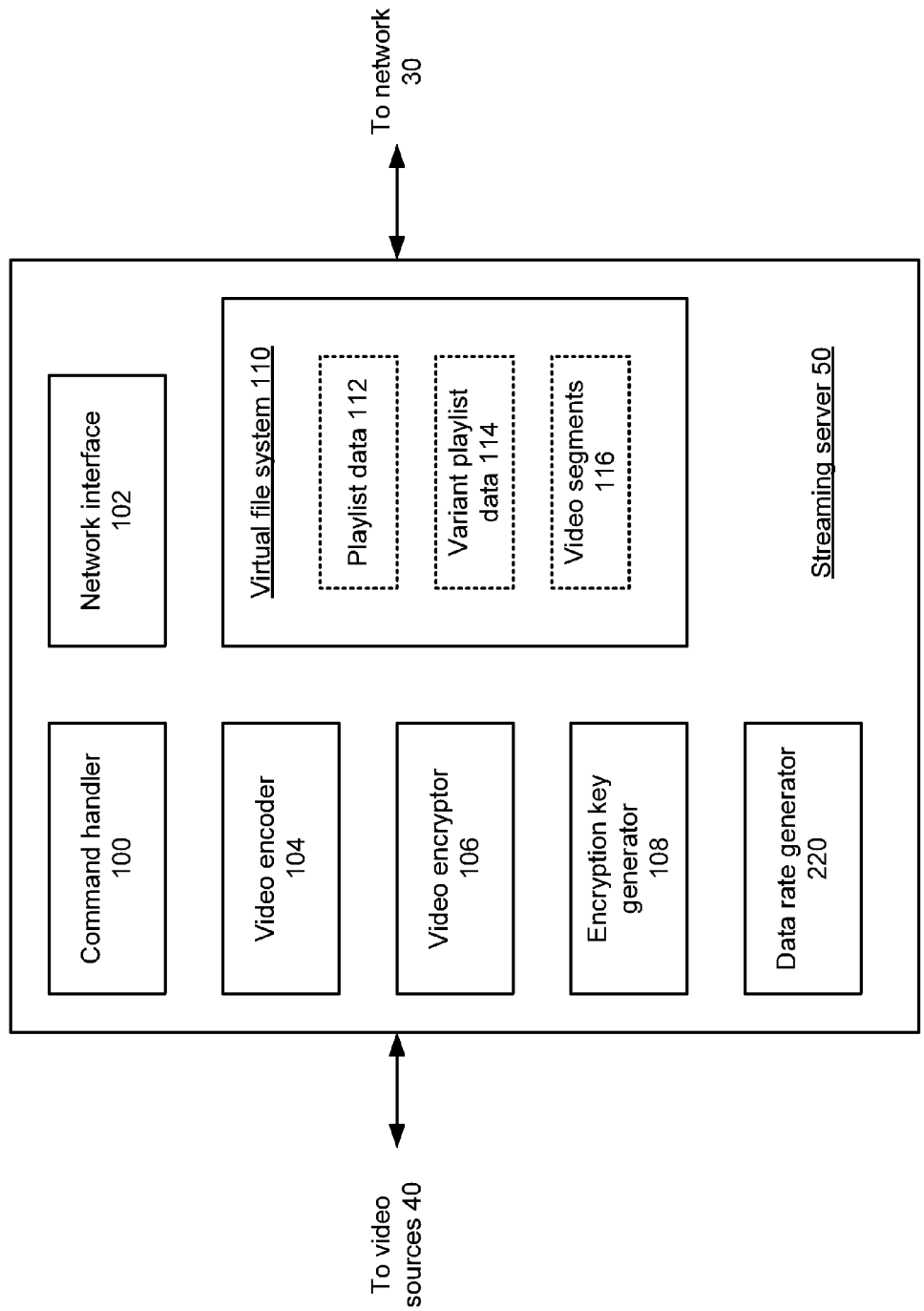
FIG. 2 presents a block diagram representation of streaming server 50 in accordance with an embodiment of the present invention.

FIG. 2 presents a block diagram representation of streaming server 50 in accordance with an embodiment of the present invention. As shown, streaming video server 50 includes a command handler 100, one or more video encoders 104 and video encryptors 106, and an encryption key generator 108. Streaming video server 50 also includes virtual file system 110 that stores playlist data 112 that includes a content index corresponding to the video programs available from the video source or sources 40 as well as a segment playlist for each video program that includes a list of addresses for each segment of that video program. Virtual file system 110 further stores variant playlist data 114 that indicates a single entry for streaming each of the plurality of video programs. The URIs in the content index, variant playlist, and segment playlist may or may not correspond to actual files as in a traditional web server or streaming server that serves files stored on hard drive. These addresses are generated by the streaming video server 50 and recognized as references to the virtual files when the client makes the HTTP request for a particular video program. This applies to the URIs for the lists themselves and also for the encrypted segment data and encryption keys. When a request is received for a "file" in the virtual file system, the server generates the appropriate response depending on the actual request. For example, (a) responding with the content index, variant playlist, segment playlist data using information stored in memory, (b) generating a random encryption key, storing it to memory (for subsequent segment requests), and sending it in the response to the client, (c), initiating video transfer from a source, initiating the encoding and segmentation, sending the first segment in the response to the client, (d) for a previously initiated transfer, encoding, segmenting, and return the next segment to the client.

A network interface 102 is included to bidirectionally communicate with at least one client device via network 30 and to bidirectionally communicate with the at least one video source, such as via a secure channel of network 30 or another network. The network interface 102 can include a modem, transceiver or other network interface adaptor that implements a serial or parallel connection such as an Ethernet connection, Universal Serial Bus (USB) connection, an Institute of Electrical and Electronics Engineers (IEEE) 1394 (Firewire) connection, small computer serial interface (SCSI), high definition media interface (HDMI) connection or other wired connection that operates in accordance with either a standard or custom interface protocol. In addition or in the alternative, the network interface 102 can include a wireless link for coupling to the network 30 and/or video source or sources 40 either directly or indirectly through one or more devices that operate in accordance with a wireless network protocol such as 802.11a,b,g,n (referred to generically as 802.11x), Bluetooth, Ultra Wideband (UWB), 3G wireless data connection, 4G wireless data connection or other wireless connection that operates in accordance with either a standard or custom interface protocol.

In operation, the command handler 100 coordinates the encoding and encryption processes with a client's requests for video content. For example, the command handler 100 receives a HTTP request for a selected one of the plurality of video programs from the at least one client device via the network interface 102. In response to the request, the selected one of the plurality of video programs is retrieved from the video source or sources 40, via the network interface. For example, the command handler can access the playlist data 112 to determine the universal resource identifier (URI) or other address for retrieving the selected one of the plurality of video programs from the video source or sources 40.

The command handler 100 retrieves the selected one of the plurality of video programs. A plurality of encoded segments are generated from selected video program, via a video encoder 104, at a selected bit rate. The video encoder 104 can include one or more encoders or transcoders that receive an encoded video program from the video source or sources 40 and that decodes and re-encodes or otherwise transcodes the audio and/or video of the program into the scale, resolution, and digital compression format, and at the selected bitrate for the requesting client device. In particular, the video encoder 104 can operate in accordance with a motion picture expert group (MPEG) format such as MPEG2, MPEG4 part 10, also referred to as H.264. Other video formats such as VC1, digital video (DV), etc., could likewise be employed. In an embodiment of the present invention, the video source or sources 40 contain unsegmented videos. Upon the client request of the first segment for a particular video and bitrate, the streaming video server 50 starts the retrieval of the video from the corresponding video source 40, and performs the encoding and segmentation. The segmentation can be done before or after the encoding, though it can be more practical to do the encoding first, then the segmentation.

Encrypted segments are generated from the encoded segments, via the video encryptor 106, based on an encryption key. The encrypted segments are then stored as video segments 116 that are then sent, via the network interface 102, as a streaming video signal to the at least one client device that requested the video program. The video encryptor 106 can operate in accordance with one or more cryptography algorithms such as data encryption standard (DES), Rivest, Shamir, Adelman (RSA), elliptical curve cryptography (ECC), Advanced Encryption Standard (AES) or other algorithm.

Streaming server module 50 includes an encryption key generator that generates the encryption key in response to the request. As discussed in conjunction with FIG. 1, the encryption key generator 108 generates encryption keys on-demand. This allows the keys to not be saved to a storage device, protecting the security of the key from being read without authorization. For increased content security, the keys can be generated randomly and are used for only one streaming session. In theory, while identical encryption keys could reoccur randomly, each encryption key is nevertheless practically or substantially unique to the request.

In an embodiment of the present invention, the rate data generator 220 generates rate data that indicates the selected bit rate. In operation, the rate data generator selects the bit rates based on channel information from network 30 pertaining to a communication channel between the network interface and the client device that generated the request. The channel information can include network bandwidth data, network utilization data, and/or other data including a channel type, expected bit rate, current actual bit rate, etc. As the bit rate is adjusted, the video encoder 106 encodes each current segment at the selected rate.

The command handler 100, video encoder 104, video encryptor 106, encryption key generator 108 rate data generator 220 and virtual file system 110 can be implemented via one or more processing devices and one or more memory devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

The streaming video server 50 has additional advantages over convention servers. The requirements for storage are reduced for the video segments, variant playlist, and playlists. This is especially important for embedded systems with limited storage capabilities. In addition, since the encryption process is performed on-demand like the encoding process, the key can be protected such that it can be accessed only by the intended client device, as opposed to all potential clients. Furthermore, the key itself can be changed while streaming is in progress, and this decision can be made during run-time as needed. These content protect features are especially important for premium content such as pay-per-view video. Further, the risk of unauthorized access to unencrypted video streams is reduced since they are never stored in encrypted or unencrypted form to a persistent storage device where they may be accessed by attackers. Also, live and pre-recorded video content can be handled differently. Streams from live sources will not suffer large delays.

Figure 3:
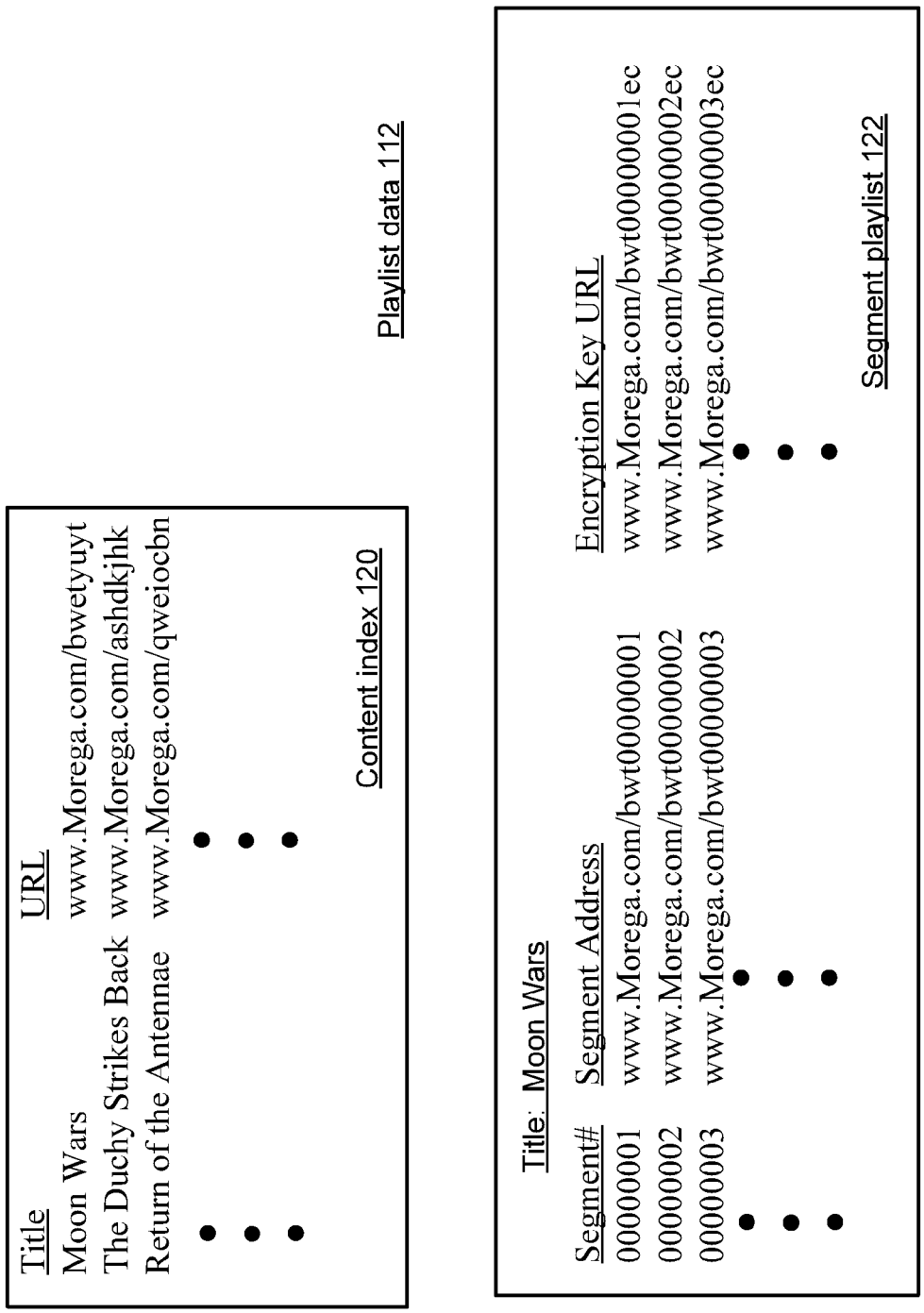
FIG. 3 presents a block diagram representation of playlist data 112 in accordance with an embodiment of the present invention.

FIG. 3 presents a block diagram representation of playlist data 112 in accordance with an embodiment of the present invention. FIG. 4 presents a block diagram representation of variant playlist data 114 in accordance with an embodiment of the present invention. In the example shown, playlist data 112 includes content index 120 a title of all available video selections from any of video sources 40, and a URI address for accessing the variant playlist data 114 for each program. The content index does not have to be in a particular format, as long as the client devices and the streaming video server 50 use the same format or the formats can be translated to be compatible. Example formats include JSON, XML, plain text, etc. Other address formats could likewise employed including a file addressing scheme, an IP address, or other logical or physical addressing. In addition, the while specific video on-demand programs are presented, as previously discussed, live video programming could be retrieved, segmented, encoded and encrypted on demand for delivery in response to a client request.

In addition, playlist data 112 includes a segment playlist 122 for each video program and for each bitrate. Each segment playlist includes a segment number and address for each segment of the video program and optionally an address of an encryption key used for encrypting that particular segment. Again, while URIs are shown, Other address formats could likewise employed including a file addressing scheme, an IP address, or other logical or physical addressing.

The virtual file system also contains variant playlists for each video program in the content index. Each variant playlist includes an address (such as the URI shown) for the segment playlists, which are also contained in the virtual file system with a single entry.

In one example of operation, the streaming video server maintains playlist data 112 that includes a content Index that is served to the client upon its request. The streaming video server 50 can, for example, query each of the video sources 40 or its list of videos, then aggregate them to the create such a content index. The content index contains, for each item, the URI of the variant playlist. The client selects one item (e.g., via user input), then makes the HTTP request for the URI corresponding to that variant playlist for that item. The variant playlist contains the segment playlist URI for a single "phantom" bitrate, as shown in FIG. 4. As discussed in conjunction with FIG. 1, this forces the client to choose the single variant entry and eliminates the adaptation of the bit rate from the client side—in lieu of the server side adaptation of the bit rate. The client makes an HTTP request for the playlist (the only item on the list). The segment playlist contains the URIs for each segment's data and each segment's encryption key.

The URIs in the content index, variant playlist, and segment playlist do not correspond to actual files as in a traditional web server or streaming server that serves files stored on hard drive; the URIs are generated by the server and recognized as references to the virtual files when the client makes the HTTP request. This applies to the URIs for the lists themselves and also for the segment data and encryption keys. When a request is received for a "file" in the virtual file system, the server generates the appropriate response depending on the actual request. For example, (a) responding with the content index, variant playlist, segment playlist data using information stored in memory, (b) generating a random encryption key, storing it to memory (for subsequent segment requests), and sending it in the response to the client, (c), initiating video transfer from a source, initiating the encoding and segmentation, sending the first segment in the response to the client, (d) for a previously initiated transfer, encoding and segmentation, return the next segment to the client. As shown the variant playlist data includes only a single entry for a particular title, a group of titles, for all programs from a particular video source 40 or from all video sources.

The streaming video server 50 provides additional advantages over a conventional HLS-based server system. Multiple video encoders 104 can be present in order to meet the simultaneous use requirements of on-demand transcoding for multiple client devices. The encoded data is generated on as-needed basis and reducing the need for persistent storage. Encryption keys can be generated on an as-needed basis and never stored except temporarily in volatile memory, also saving storage. By not storing encoded data and encryption keys, content security is improved. Also, live and pre-recorded content can be handled differently, resulting in improved user experience.

A conventional HLS-based server system must store the video for all bitrate settings. The requirement for storage capacity grows with the number of bitrate settings and duration of the video. The data must be stored even though it may never be requested by the client, because it can't be absolutely determined at encoding time which particular segments will be used by the clients. In the present system, the data resulting from video transfer from a video source 40, encoding, key generation, and encryption are not stored to persistent storage (e.g. a hard drive). Transfer, encoding, segmentation, and encryption on a source video can be deferred until that video is requested by the client.

In addition, in a conventional HLS-based server system, the bitrates for the video must be set before the encoding process starts. Some knowledge of the expected network capacity and playback device types is required in order to select the appropriate bitrates. Typically, three bitrates are used: one low bitrate setting of approximately 64 kbps, and two higher settings between 100 and 500 kbps. Setting the bitrates at encoding time means that the target use cases are also set. Any unexpected cases (e.g., very high network capacity, a new client device) are not addressed. When the video segments are encrypted, an encryption key must be selected that is to be used by all clients.

In contrast, the streaming video server 50 can employ adaptive bitrates without having to encode and store the encoded and encrypted video segments for an entire program at all of those bitrates prior to streaming. In an embodiment of the present invention, prior to streaming, little needs to be known about the client device and the possible network conditions. In addition, since bitrate settings are adjusted to adapt to current conditions adjustments and generated on the fly, these adjustments can be made with a fine granularity over the full range required. This reduces the distracting effect of the video and audio quality changing greatly from one segment to the other due to a large change in bitrate. More importantly, the adaptive bitrate feature allows the network usage to be optimized for the current conditions. That is, it is more likely that the selected bitrate is the maximum allowed by the network connection between the server and client, thus maximizing the video and audio quality for the end user.

Figure 5:
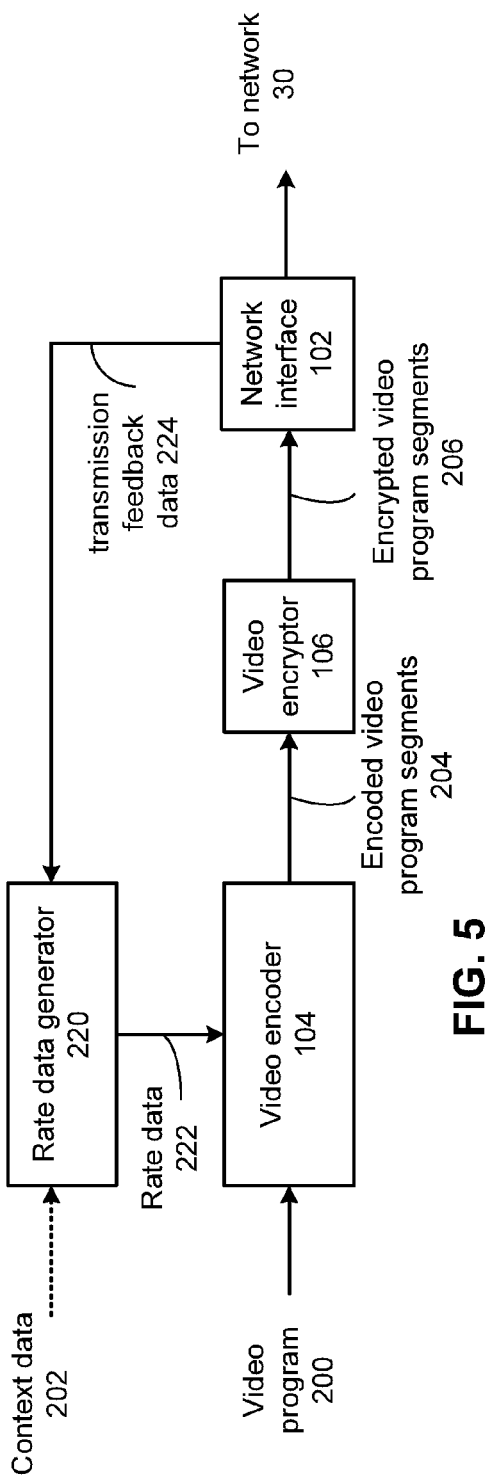
FIG. 5 presents a block diagram representation of an encoder 104 in accordance with an embodiment of the present invention.

FIG. 5 presents a block diagram representation of an encoder 104 in accordance with an embodiment of the present invention. In this embodiment, the video encoder 104 encodes the selected video program 200 into encoded video program segments 204. Video encryptor 106 encrypts the encoded video programs segments 204 into encrypted video program segments 206 based on an encryption key, such as a key from encryption key generator 108. The encrypted video program segments 206 are transmitted over network 30 via network interface 102. In operation, rate data generator 220 generates rate data 222 based on transmission feedback data 224 from the network interface 102 that reflects the channel conditions. Transmission feedback data 224 can also include data from the client device 60, 62, 64, 66 or 68 that indicates information regarding that client device. Examples of such client data includes a current one of a plurality of device states, such as a client device operating system, video display window size (minimized, partial or full screen) or a volume setting that can be used to adjust the video resolution, or audio encoding depth, the number of audio channels or be used to decide whether to or not to include audio information in the stream. The rate data 222 can also be optionally based on context data 202 that relates to the content of the video program 200. The context data 202 can indicate information derived from the video program 200 or the video source 40 such as the genre of video (e.g., news, sit com, music, cartoon, video conference), the number of audio channels and/or other information regarding the characteristics, properties or format of the video program 200.

The video encoder 104 encodes the video program segments based on one or more encoding parameters that are adjusted in response to rate data 222 that relates to the streaming session for the selected video program.

As discussed in conjunction with FIG. 2, video encoder 104 can operate in accordance with a motion picture expert group (MPEG) format such as MPEG2, MPEG4 part 10, also referred to as H.264. Other video formats such as VC1, digital video (DV), etc., could likewise be employed. In an embodiment of the present invention, the video program 200 can be segmented before or after encoding. Video encoder 104 can be implemented via one or more processing devices and one or more memory devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

In operation, the streaming server 50 responds to the segment requests by encoding the source content at the selected bitrate. The encoding process is performed on-demand, therefore the encoding parameters can be adjusted to conform with the rate data 222 that reflects the conditions of the current streaming session. In response to the rate data 222, the video encoder 104 can adaptively choose or otherwise adjust the overall average bitrate of a segment, and for a selected overall average bitrate, the average bitrate of the audio content and the average bitrate of the video content. In addition, the video encoder 104 can adaptively choose or otherwise adjust other encoding parameters such as the output video resolution, the output video frame rate, the number of encoded audio channels, etc.

Figure 6:
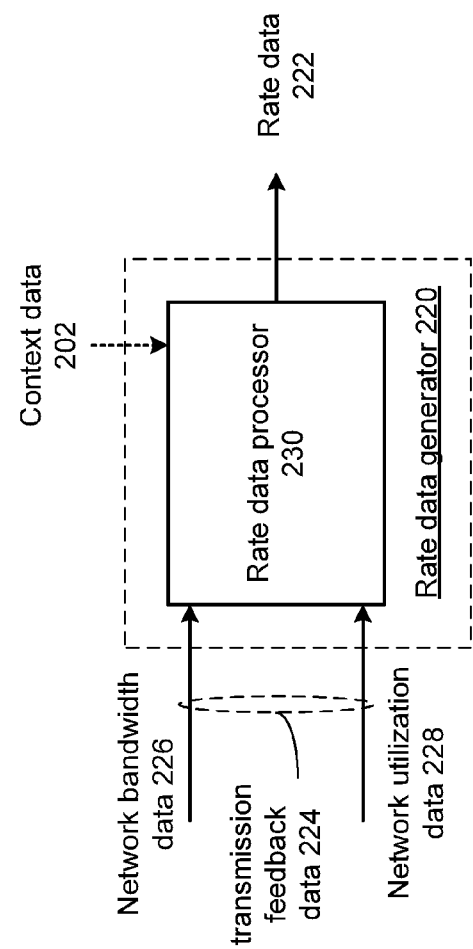
FIG. 6 presents a block diagram representation of a rate data generator 220 in accordance with another embodiment of the present invention.

FIG. 6 presents a block diagram representation of a rate data generator 220 in accordance with another embodiment of the present invention. In particular, rate data generator 220 includes a rate data processor 230 that operates based on transmission feedback data 224 and optionally based on context data 202 to generate rate data 222. The rate data processor 230 can be implemented via one or more processing devices and one or more memory devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

In an embodiment, the rate data processor 230 operates based on transmission feedback data 224 that includes network bandwidth data 226 and network utilization data 228. Network bandwidth data 226 represents a number of bytes per second transferred over the network connection. For example, this quantity can be calculated based on an average number of bytes sent to the client in the last 15 seconds. It can be measured in bytes per second and calculated as a running average such as an unweighted average, an exponentially weighted moving average, a filtered average or other mean, median or other average. Network utilization data 228 can be calculated based in the percentage of time spent in data transmission in a particular second—i.e. what part of that second the network interface 120 was busy with sending data to network 30. For example, this quantity can be calculated based on by measuring the amount of time spent in a socket write( ) function during each second. Spending 500 ms of a particular second in writing data to the channel yields a 50% utilization.

The rate data 222 can be calculated based on the value of the variable "bitrate" in the following algorithm.

```
if ( aUtilization < mTargetUtilization )
{
    // try to speed-up
    if ( aUtilization < 10 )
    {
        // less than 10% utilization is not reliable, try to use double
```

-continued

```
rate than the current speed
        bitrate = aSpeed * 2;
    }
    else
    {
        realSpeed = aSpeed * 100 / aUtilization;
        bitrate = realSpeed * mTargetUtilization / 100;
    }
}
else
{
    // try to slow down
    bitrate = aSpeed * mTargetUtilization / aUtilization;
}
``` where aUtilization and aSpeed are current network utilization (network utilization data 228) and current network speed (network bandwidth data 226) and mTargetUtilization is a maximum percentage of the total reachable bandwidth which could be used for transmission streaming data. Reserving some amount to account for errors in bitrate calculation, and for different overheads such us HTTP headers etc., mTargetUtilization can be set at 90% or other limit.

In addition, to the algorithm above, the rate data processor 230 can adjust the rate data 222 based on a minimum data rate. In particular, the HLS protocol prohibits changing of any parameters of the stream. Particularly, if the stream contained both video and audio, each of its segments of any bitrate should always contain both video and audio disregarding of how low the bitrate is. Moreover, the audio parameters, including the bitrate, stay the same for all bitrates for current stream. Therefor the lowest reachable bitrate may be limited based on the bit rate required to send the audio track. As the video track couldn't be completely removed, in an embodiment, to get as close to the audio bitrate as possible, the encoded video program segments can be replaced with a still image of the video program 200, a standard still image or other still image. A bitrate of such a video stream should be close to zero, which makes the total bitrate of the stream equal to audio bitrate.

At the beginning of a video program, the rate data generator can adjusts the rate data 222 based on an initial data rate that starts the stream at the first segment. The initial data rate can be fixed as a nominal data rate, estimated based on partial transmission feedback data 224 and/or generated based on context data that indicates properties of the selected one of the plurality of video programs.

While the rate data 222 can be generated as described above, other techniques can likewise be employed. The rate data 222 be generated based on a bandwidth assessment or other bandwidth test performed in response to the request for the selected video program 200. A channel bandwidth test can be performed prior to transmission of the first segment. For example, prior to requesting the first segment, the client device 60, 62, 64, 66 or 68 can request a URI that is specifically used to perform the channel bandwidth test. The streaming server 50 recognizes this request and responds with a test signal to the requesting client device. The transfer rate of the test signal can be measured by the streaming server 50. For example, the response to the variant playlist request can be padded with content that is to be ignored by the requesting client device (normal variant playlist content still exists). This can be done by placing whitespace characters at the end, or inserting lines that start with the comment character '#'. The amount of data can be chosen so the total size of the variant playlist is suitable for a channel bandwidth test while reducing the time delay in starting the playback of the selected video program to the user. Using too much data could slow the user experience, while using too little data could reduce the accuracy of the test result. The transfer rate of the variant playlist is measured by the streaming server 50.

Figure 7:
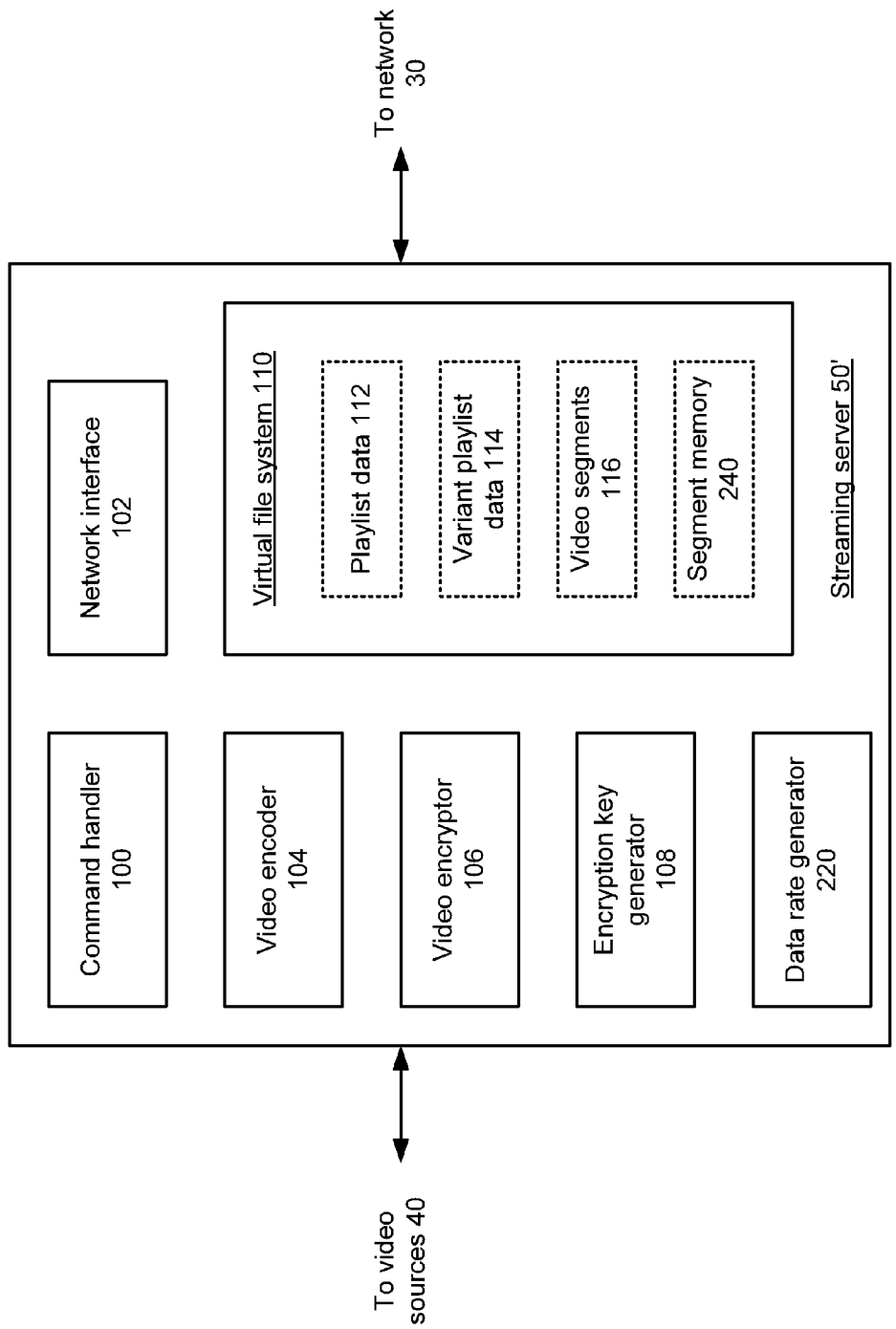
FIG. 7 presents a block diagram representation of streaming server 50' in accordance with an embodiment of the present invention.

FIG. 7 presents a block diagram representation of streaming server 50' in accordance with an embodiment of the present invention. In particular, a streaming server 50' is presented that operates in a similar fashion to streaming server 50 and that includes many similar elements to streaming server 50 that are referred to by common reference numerals. Streaming server 50' includes a segment memory 240 that includes one or more initial video program segments for each title in the content index that can be used to initialize the video stream when the first video segments are being produced. This reduces the latency period of the stream—speeding up the time to transmission of the first segments since there is no need to wait for encoding or transcoding—these initial segments can be retrieved directly from the segment memory. Further details of this configuration including optional functions and features will be described in conjunction with FIGS. 8 and 9 that follow.

FIG. 8 presents a block diagram representation of an encoder 104 in accordance with an embodiment of the present invention. A similar structure is presented to FIG. 5 that includes many similar elements that are referred to by common reference numerals. This configuration includes a segment memory 240 that stores one or more stored initial video program segments for each video program in the content index. When a particular video program 200 is requested, the initial segment or segments of the stream can be retrieved from the segment memory 240 as stored initial program video segments 242 that are passed by multiplexer 244 to video encryptor 106. At the same time that these stored initial video program segments 242 are being retrieved, the video encoder 104 can begin encoding or transcoding the video program 200 to generate encoded video program segments 204. In an embodiment, the video encoder 104 begins the production of encoded video program segments 204 at a point in time before a request for the corresponding segment arrives. In this fashion, if/when the request for the segment arrives, the video encoder 104 is prepared. In this configuration, a buffer of the video encoder 104 (not expressly shown) is used to store the encoded video segment 204.

The multiplexer 244 can switch the stream from the stored initial video program segments 242 to the encoded video program segments 204 when the stored initial video program segments 242 are exhausted. In other mode of operation, the multiplexer 244 can switch the stream from the stored initial video program segments 242 to the encoded video program segments 204 when the first encoded video program segments 204 is complete and corresponding prior segment from the stored initial video program segments 242 has been passed to the video encryptor 106.

FIG. 9 presents a temporal diagram representation of program segments in accordance with an embodiment of the present invention. In particular, a plurality of segments (001-009) of a video program that are output from the multiplexer 244 are shown. In this example when a request for a first segment (001) of a particular video program arrives the video encoder 104 begins the production of encoded video program segments 204 beginning at segment (004)—at a point in time before a request for the segment (004) arrives. The multiplexer 244 begins feeding the first three segments (001-003) of the video program as the stored initial video program segments 242 during the time the encoder 104 is initializing. By the time the last stored segment (003) is passed to the video encryptor 106, the next segment (004) is ready from the video encoder 104 and when a request for the segment (004) arrives, the multiplexer 244 can switch to the encoded video program segments 204.

In the example shown, the multiplexer 244 generates output segments to the video encryptor as the initial video program segments (001-003) during an initial latency period of the video encoder in producing a first encoded video segment (004)—the next segment in a temporal sequence of the video program segments. Said another way, the initial video program segments (001-003) cover an initial temporal period of a selected video program corresponding to an initial latency period of the video encoder 104 in producing a first segment of the encoded video segments (004).

The number of stored initial program segments 242 can be selected based on their duration to cover or more than cover any such latency period. In the example described above, segments (004-005) may also be stored in the segment memory 240 for use if necessary, depending on the selected encoding bit rate. If a video segment is requested by the client device that has already been encoded and the corresponding stored initial video program segment has not been sent, the multiplexer 244 can switch to sending the encoded video program segment corresponding to the request in lieu of the stored initial video program segment of this number.

It should also be noted that transmission feedback data 224 can be generated during the transmission of the stored initial video program segments in order to more quickly generate meaningful rate data 222.

FIG. 10 presents a flowchart representation of a method in accordance with an embodiment of the present invention. In particular a method is shown for use in conjunction with one or more functions and features described in conjunction with FIGS. 1-9. In step 400, playlist data corresponding to a plurality of video programs available from at least one video source, are stored. In step 402, variant playlist data corresponding to each of the plurality of video programs that indicates a single variant for streaming each of the plurality of video programs, are stored. Step 404 is directed to bidirectionally communicating with a client device and the at least one video source via a network interface, wherein the network interface further generates transmission feedback data. In step 406, rate data is generated based on the transmission feedback data. In step 408, a request for a selected one of the plurality of video programs is received from the client device via the network interface. In step 410, the selected one of the plurality of video programs is retrieved from the at least one video source via the network interface in response to the request. In step 412, the selected one of the plurality of video programs is encoded into a plurality of encoded video program segments at a rate that is controlled based on the rate data.

In an embodiment, the transmission feedback data includes a network transmission speed and further includes a network utilization. The data rate is adjusted based on the transmission speed, the network utilization, a target utilization, a minimum data rate, and/or an initial data rate. The initial data rate can be generated based on context data that indicates properties of the selected one of the plurality of video programs.

FIG. 11 presents a flowchart representation of a method in accordance with an embodiment of the present invention. In particular a method is shown for use in conjunction with one or more functions and features described in conjunction with FIGS. 1-10. In step 420, playlist data are stored corresponding to a plurality of video programs available from at least one video source. In step 422, variant playlist data are stored corresponding to each of the plurality of video programs. In step 424, at least one initial video program segment is stored for each of the plurality of video programs. Step 426 is directed to bidirectionally communicating with a client device and the at least one video source via a network interface, wherein the network interface further generates transmission feedback data. In step 428, rate data is generated based on the transmission feedback data. In step 430, a request for a selected one of the plurality of video programs is received from the client device via the network interface. In step 432 the selected one of the plurality of video programs is retrieved from the at least one video source via the network interface in response to the request. In step 434, the selected one of the plurality of video programs is encoded into a plurality of encoded video program segments at a rate that is controlled based on the rate data. In step 436, a plurality of output segments are generated by multiplexing the at least one initial video program segment corresponding to the selected one of the plurality of video programs with the plurality of encoded video program segments.

In an embodiment, the output segments are generated as the initial video program segment or segments during an initial latency period of the video encoder in producing a first encoded video segment in a temporal sequence of the plurality of encoded video program segments. A plurality of initial video program segments are stored that cover an initial temporal period of selected one of the plurality of video programs corresponding to an initial latency period of the video encoder in producing a first encoded video segment in a temporal sequence of the plurality of encoded video program segments.

The data rate can be adjusted based on the transmission speed, the network utilization, a target utilization, a minimum data rate, and/or an initial data rate. The initial data rate can be generated based on context data that indicates properties of the selected one of the plurality of video programs. The initial video program segment or segments can be generated at a nominal data rate. The variant playlist can indicates a single variant for streaming each of the plurality of video programs.

Figure 12:
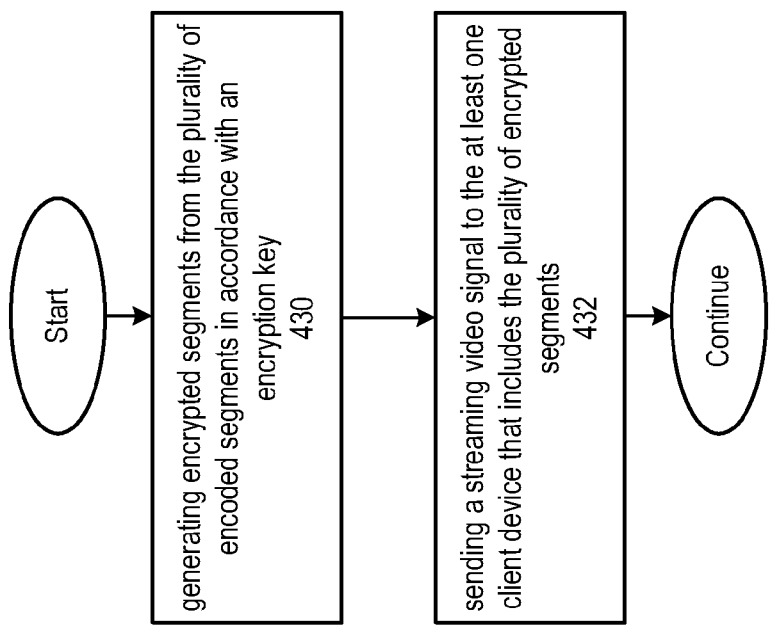
FIG. 12 presents a flowchart representation of a method in accordance with an embodiment of the present invention.

FIG. 12 presents a flowchart representation of a method in accordance with an embodiment of the present invention. In particular a method is shown for use in conjunction with one or more functions and features described in conjunction with FIGS. 1-11. In step 430, encrypted segments are generated from the plurality of encoded segments from the method of FIG. 10 (or the output segments of FIG. 11) in accordance with an encryption key. In step 432, a streaming video signal is sent to the client device via the network interface, that includes the plurality of encrypted segments.

In preferred embodiments, optional circuit components can be implemented using 0.35 micron or smaller CMOS technology. Provided however that other circuit technologies, both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a media distribution system. While described primarily in terms of video programming, it is understood that the video programming can include associated audio and that the present invention could likewise to be applied to associated audio or the distribution of audio programming that is unassociated with video. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A streaming server comprising:
   at least one memory;
   at least one processor that operates in conjunction with the at least one memory;
   a virtual file system that operates via the at least one memory that stores playlist data corresponding to a plurality of video programs available from at least one video source in a memory of the streaming server and that further stores variant playlist data corresponding to each of the plurality of video programs, wherein the virtual file system includes a segment memory that stores at least one initial video program segment for each of the plurality of video programs;
   a network interface, coupled to bidirectionally communicate with a client device and to bidirectionally communicate with the at least one video source via at least one network, wherein the network interface further generates transmission feedback data;
   a rate generator that operates via the at least one processor, coupled to the network interface, that generates rate data based on the transmission feedback data;
   a command handler that operates via the at least one processor, coupled to the network interface, and the virtual file system, that receives a request for a selected one of the plurality of video programs from the client device via the network interface and retrieves the selected one of the plurality of video programs from the at least one video source via the network interface in response to the request; and a video encoder that operates via the at least one processor, coupled to the rate generator and the command handler, that encodes the selected one of the plurality of video programs into a plurality of encoded video program segments at a rate that is controlled based on the rate data; and a multiplexer that the operates via the at least one processor of the streaming server, coupled to the virtual file system and the video encoder, that generates a plurality of output segments from the at least one initial video program segment corresponding to the selected one of the plurality of video programs during an initial temporal period and that generates the plurality of output segments from the plurality of encoded video program segments subsequent to the initial temporal period in a temporal sequence of the plurality of output segments, wherein the at least one initial video program segment includes a plurality of initial video program segments that cover the initial temporal period of selected one of the plurality of video programs corresponding to an initial latency period of the video encoder in producing a first encoded video segment in a temporal sequence of the plurality of encoded video program segments.

2. The streaming server of claim 1 further comprising:
a video encryptor, coupled to the network interface, the video encoder and the command handler, that generates encrypted segments from the output segments in accordance with an encryption key;
wherein the network interface sends a streaming video signal to the client device that includes the encrypted segments.

3. The streaming server of claim 1 wherein the rate generator adjusts the data rate based on an initial data rate.

4. The streaming server of claim 1 wherein the at least one initial video program segment is generated at a nominal data rate.

5. The streaming server of claim 1 wherein the variant playlist indicates a single variant for streaming each of the plurality of video programs.

6. The streaming server of claim 4 wherein the initial data rate is generated based on context data that indicates properties of the selected one of the plurality of video programs.

7. A method for use in a streaming server, the method comprising:
storing playlist data corresponding to a plurality of video programs available from at least one video source in at least one memory;
storing variant playlist data corresponding to each of the plurality of video programs in the at least one memory;
storing at least one initial video program segment for each of the plurality of video programs in the at least one memory;
bidirectionally communicating with a client device and the at least one video source via a network interface, wherein the network interface further generates transmission feedback data;
generating rate data via at least one processor based on the transmission feedback data;
receiving a request for a selected one of the plurality of video programs from the client device via the network interface;
retrieving the selected one of the plurality of video programs from the at least one video source via the network interface in response to the request;
encoding the selected one of the plurality of video programs via the at least one processor into a plurality of encoded video program segments at a rate that is controlled based on the rate data; and
generating a plurality of output segments via the at least one processor as the at least one initial video program segment corresponding to the selected one of the plurality of video programs during an initial temporal period and as the plurality of output segments from the plurality of encoded video program segments subsequent to the initial temporal period in a temporal sequence of the plurality of output segments, wherein the at least one initial video program segment includes a plurality of initial video program segments that cover the initial temporal period of selected one of the plurality of video programs corresponding to an initial latency period of the video encoder in producing a first encoded video segment in a temporal sequence of the plurality of encoded video program segments.

8. The method of claim 7 further comprising:
generating encrypted segments from the output segments in accordance with an encryption key; and
sending a streaming video signal to the client device that includes the plurality of encrypted segments via a network interface.

9. The method of claim 7 wherein the data rate is adjusted based on an initial data rate.

10. The method of claim 7 wherein the at least one initial video program segment is generated at a nominal data rate.

11. The method of claim 7 wherein the variant playlist indicates a single variant for streaming each of the plurality of video programs.

* * * * *